July 31, 1923. Re. 15,666
S. PAUL
ADJUSTABLE GUIDE FOR HAMMERS
Original Filed May 3, 1917
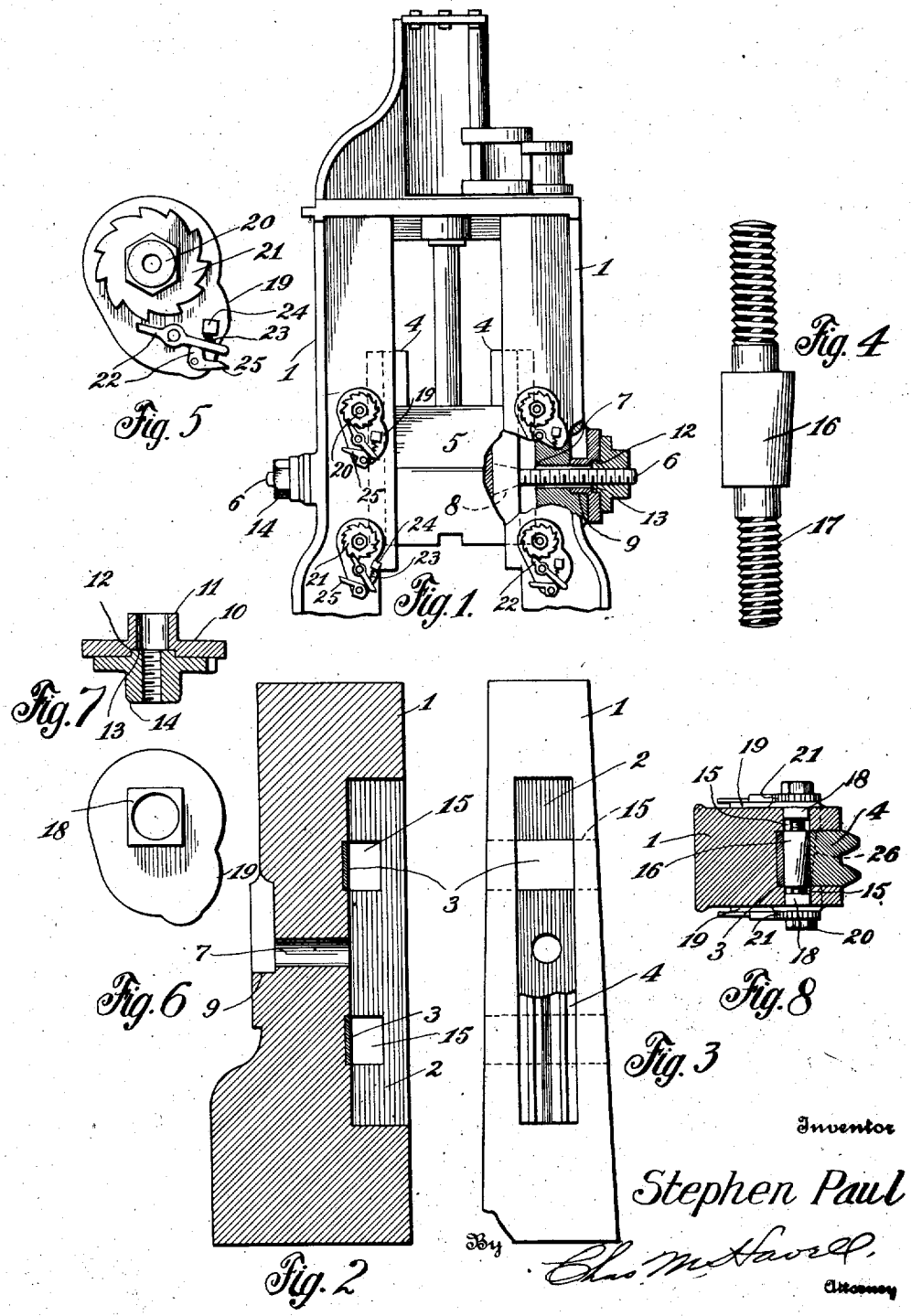

Reissued July 31, 1923. Re. 15,666

UNITED STATES PATENT OFFICE.

STEPHEN PAUL, OF LANSING, MICHIGAN, ASSIGNOR, BY MESNE ASSIGNMENTS, TO THE MASSILLON FOUNDRY & MACHINE COMPANY, OF MASSILLON, OHIO.

ADJUSTABLE GUIDE FOR HAMMERS.

Original application filed May 3, 1917, Serial No. 166,132. Renewed May 28, 1920, Serial No. 385,067. Original No. 1,352,621, dated September 14, 1920. Application for reissue filed July 5, 1922. Serial No. 573,059.

*To all whom it may concern:*

Be it known that I, STEPHEN PAUL, a citizen of the United States of America, residing at Lansing, in the county of Ingham and State of Michigan, have invented certain new and useful Improvements in Adjustable Guides for Hammers, of which the following is a specification, reference being had therein to the accompanying drawings.

This invention relates to adjustable guides for reciprocable members, and has special reference to the guides in the housing of a hydraulic or steam hammer, such as used for forging purposes.

My invention in its broadest aspect involves means for minutely adjusting guides and positively holding the same against accidental displacement during the reciprocation of a member, as a hammer head, between the guides.

Specifically, my invention includes tapering members adapted for laterally adjusting guides to compensate for wear and permit of the guides being adjusted so as to insure an easy movement of the reciprocable member therebetween, without any danger of a binding action or sticking of a hammer head between the guides. Associated with the tapering members are locking devices that positively hold the members in adjusted position, and my invention will be fully understood when reference is had to the drawing, and the following detail description.

In the drawing,

Figure 1 is a front elevation of a portion of a steam hammer, partly broken away and partly in section, showing the adjustable guides and the means for adjusting said guides;

Fig. 2 is an enlarged vertical sectional view of a portion of the hammer housing;

Fig. 3 is a view of the inner face of a portion of the housing;

Fig. 4 is an enlarged view of the detached tapered member;

Fig. 5 is an enlarged front elevation of a locking device for the tapered member;

Fig. 6 is a rear elevation of one of the same;

Fig. 7 is a horizontal section of a portion of one of the guide locking devices; and Fig. 8 is an enlarged horizontal sectional view of a portion of the hammer housing showing a guide adapted to be adjusted by a tapered member.

In the drawing, 1 denotes the frames of a hammer housing and the confronting faces of these frames are provided with pockets 2 containing wear plates 3 for adjusting wedges for the guides 4 of a reciprocable hammer head 5; the lower ends of the pockets forming supporting bearings for the guides, and the depth of the pocket being sufficient to receive the guides completely therein for readily removing the hammer head.

The guides 4 have screw bolts 6 extending through openings 7 of the frames 1 and said screw bolts have tapering heads 8 seated in the guides 4 so that should a screw bolt be injured or accidentally broken, it may be quickly removed, without discarding the guide held thereby.

At the outer ends of the frame opening 7 are rectangular seats 9 for non-rotatable washers 10, said washers having rectangular portions 11 adapted to engage in the seats 9. The washers 10 also have annular recesses 12 to receive cylindrical portions 13 of nuts 14 screwed upon the bolts 6, and these nuts may be adjusted to lock the guides 4 after the same have been properly positioned.

The housing frames 1 above and below the bolt openings 7 are provided with transverse openings 15 having the walls thereof in a plane with the wear plates 3 set in the pockets 2. The openings 15 provide clearance for tapered members 16 having screw-threaded shanks 17 and as these members and the adjusting and locking devices thereof are identical in construction, I deem it only necessary to describe the devices of one of the openings 15.

Each opening 15 is rectangular in cross section with a screwthreaded shank 17 protruding therefrom. Extending into the opening 15 is a non-rotatable washer 18 having a side extension 19. Screwed on the threaded shank 17 is a nut 20, and the washer 18 and the nut 20 are somewhat similar to the washer 10 and the nut 14 previously mentioned. The nut 20, however, has a ratchet portion 21, and adapted to engage the ratchet portion is a spring pressed pivoted pawl 22 carried by the side extension 19 of the washer 18. The pivoted pawl 22 is normally held in engagement with the ratchet portion 21 of the nut 20 by a spring 23 interposed between said pawl and a lug 24 on the side extension 19. Adjacent the pivoted pawl 22 is a pivoted cam member 25 and this cam member can be swung into engagement with the pawl 22 to hold said pawl out of engagement with the ratchet nut, with the spring 23 under compression. With the parts in this position, as illustrated in Fig. 5, the ratchet nut 20 can be unscrewed, but when the ratchet nut is tightened, the cam member 25 is swung out of engagement with the pawl 22, so that the pawl will engage the ratchet nut and hold it against counterclockwise rotation. In other words, the ratchet nut is held in the position to which it is adjusted.

With ratchet nuts on the threaded shanks 17 of a tapered member, the tapered member can be shifted in the pocket 2 and in a transverse opening 26 provided therefor in the guide 4, and it is through the medium of the tapered member that the guide 4 can be shifted in and out of the pocket 2 so as to properly engage and guide the hammer head 5.

By using four of the tapered members 16 there may be a uniform adjustment of the guides, thus maintaining the faces of said guides in perfect parallelism to insure nonfrictional movement of the hammer head between said guides; it being understood that the guides themselves will be out of parallelism with respect to their original positions, after their faces have been worn by the hammer.

It will be understood that the openings 7 in the housing frames are larger than the shanks of the screw bolts 6, so that the bolt shanks have sufficient play in the openings in order that the guides 4 can be oscillated, either by a flexion of the bolt shanks or a loosening of the nuts 14, to the slight extent required for an adjustment of the guides by the tapered members; and that the bolts 6 hold the guides 4 against the tapered member 16 and cooperate therewith in preventing accidental displacement of the guides during the reciprocation of the hammer head 5.

It is apparent that the tapered member 16 constitutes means in proximity to the ends of the guides for laterally adjusting the same within the pockets 2 of the hammer housing and that the screw bolts 6 and the nuts 14 constitute locking means, interposed between the tapered members and intermediate the ends of the guides 4, for holding said guides after having been adjusted by the tapered members.

While in the drawings there is illustrated a preferred embodiment of my invention, it is to be understood that the structural elements are susceptible to such variations and modifications as fall within the scope of the appended claims.

What I claim is:—

1. The combination with a housing having frames provided with pockets and rectangular openings, guides in the pockets of the housing frames for a reciprocable member in the housing, tapered members in some of the frame openings and having screw bolts protruding therefrom and adapted for adjusting said guides, and screw bolts carried by said guides and protruding from the other openings and adapted for locking said guides in adjusted positions, of means for adjusting all of said screw bolts, said means comprising washers having rectangular portions to engage in the rectangular openings of said frames, ratchet nuts rotatable in said washers and screwed on said bolts, spring pressed pawls on said washers normally engaging said ratchet nuts, and cam members on said washers adapted to be manually swung into engagement with said pawls to hold said pawls out of engagement with said nuts.

2. In a guide for drop hammers, a drop hammer side frame having a pocket with a bearing face at the bottom of the pocket, a guide adapted to fit in the pocket and to rest upon the bearing face, a retaining device for the guide and independent adjustments for the upper and lower parts of the guide to adjust the guide out of parallelism with its initial position in the adjusted positions.

3. In a guide for drop hammers, a drop hammer side frame having a pocket, a guide adapted to fit in the pocket, a retaining device for the guide permitting it to oscillate in the pocket and independent adjusting means for upper and lower parts of the guide to adjust it, and capable of oscillating it in the pocket.

4. In a guide for drop hammers, a drop hammer side frame having a pocket, a guide adapted to rest within the pocket, its weight being adapted to be supported by the bottom of the pocket, a retaining device for said guide and independent wedge adjustments for the upper and lower parts of the guide.

5. In a guide for drop hammers, a drop hammer side frame having a pocket, a guide withdrawable into the pocket, a retaining device permitting it to oscillate in the pocket and independent wedge adjustments for the upper and lower parts of the guide, transversely movable with respect to the guide for effecting the adjustment by oscillating the guide.

6. In a guide for drop hammers, a drop hammer side frame having a pocket, a guide withdrawable into the pocket, a retaining device for said guide connected near the middle thereof and independent wedge adjusting mechanisms for the upper and lower parts of the guide, located above and below the retaining device respectively and transversely movable with respect to the guide to effect the adjustments.

7. In a guide for drop hammers, a drop hammer side frame having a pocket, a guide withdrawable into the pocket, a retaining device for said guide and independent wedge and adjusting mechanisms for the upper and lower parts of the guide transversely movable with respect to the guide and free from the retaining device for effecting the adjustment and removable to permit withdrawal of the guide into the pocket.

8. In a guide for drop hammers, a drop hammer side frame having a pocket, a guide adapted to rest in the pocket and capable of entire withdrawal therein, retaining means for holding the guide in position, and independent adjustments for the upper and lower parts of the guide, capable of withdrawal laterally of the guide to permit the guide to rest within the pocket.

9. The combination in a steam hammer, of a standard; a guide oscillatably connected on the standard; a hammer head; means for reciprocating the head; a wedge located back of each end of a guide; and means for adjusting the wedges.

STEPHEN PAUL.